United States Patent
Rapoport et al.

(10) Patent No.: US 10,650,630 B2
(45) Date of Patent: May 12, 2020

(54) AUTHENTICATION SYSTEMS, AUTHENTICATION DEVICES, AND METHODS FOR AUTHENTICATING A VALUE ARTICLE

(71) Applicant: Honeywell International Inc., Morristown, NJ (US)

(72) Inventors: William Ross Rapoport, Bridgewater, NJ (US); Chirag Patel, Bridgewater, NJ (US); Jack Steven Croiter, Brooklyn, NY (US); Karl D. Nelson, Plymouth, MN (US); Jeffrey James Kriz, Eden Prairie, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 271 days.

(21) Appl. No.: 14/921,564

(22) Filed: Oct. 23, 2015

(65) Prior Publication Data

US 2016/0125682 A1    May 5, 2016

Related U.S. Application Data

(60) Provisional application No. 62/073,354, filed on Oct. 31, 2014, provisional application No. 62/164,131, filed on May 20, 2015.

(51) Int. Cl.
*G07D 7/12* (2016.01)
*G07D 7/121* (2016.01)
*G01N 21/64* (2006.01)

(52) U.S. Cl.
CPC ............. *G07D 7/12* (2013.01); *G01N 21/64* (2013.01); *G07D 7/121* (2013.01)

(58) Field of Classification Search
CPC ..................................... G07D 7/124
See application file for complete search history.

(56) References Cited

U.S. PATENT DOCUMENTS 5,918,960 A  *  7/1999  Hopwood ............. G07D 7/121
                                                  356/71
6,610,351 B2    8/2003  Shchegolikhin et al.
(Continued)

FOREIGN PATENT DOCUMENTS

GB           2334574 A     8/1999
JP        2005258817 A     9/2005
(Continued)

OTHER PUBLICATIONS

The International Search Report dated Feb. 11, 2016 in International Application No. PCT/US2015/057980.
(Continued)

*Primary Examiner* — Edwin C Gunberg
(74) *Attorney, Agent, or Firm* — Lorenz & Kopf, LLP (57) ABSTRACT

Methods are provided for authenticating a value article that includes a luminescent material. An exciting light source, an optical filter, a photodetector, a signal manipulation circuit, and an amplifier are provided. The luminescent material is exposed to light produced by the exciting light source. Radiation including light from the exciting light source and emitted radiation from the luminescent material is filtered using the optical filter to produce filtered radiation. The filtered radiation is detected using the photodetector to produce a detected radiation signal. The detected radiation signal is electronically manipulated using the signal manipulation circuit to reduce an effect of light from the exciting light source on an authentication determination based upon the detected radiation signal. The detected radiation signal is amplified with the amplifier after electronic manipulation to produce an amplified electronic signal. The amplified electronic signal or data derived therefrom is converted to an authentication output.

20 Claims, 3 Drawing Sheets

(56) References Cited

U.S. PATENT DOCUMENTS

| | | | |
|---|---|---|---|
| 6,850,592 B2 | 2/2005 | Schramm et al. | |
| 7,030,371 B2 | 4/2006 | Vasic et al. | |
| 7,557,908 B1 | 7/2009 | Nagasaka et al. | |
| 8,038,063 B2 | 10/2011 | Lee | |
| 8,328,102 B2 | 12/2012 | Rapoport et al. | |
| 8,395,122 B2 | 3/2013 | Allen et al. | |
| 8,400,509 B2 | 3/2013 | Rapoport et al. | |
| 8,487,272 B2 | 7/2013 | Tinsley | |
| 8,643,064 B2 | 2/2014 | Tian et al. | |
| 8,786,839 B2 | 7/2014 | Cronin et al. | |
| 8,822,954 B2 | 9/2014 | Li et al. | |
| 2003/0062422 A1 | 4/2003 | Fateley et al. | |
| 2005/0178841 A1 | 8/2005 | Jones et al. | |
| 2006/0253290 A1 | 11/2006 | Kwon | |
| 2007/0246543 A1* | 10/2007 | Jones | B41M 3/144 235/491 |
| 2008/0046199 A1* | 2/2008 | Power | G07D 7/0013 702/35 |
| 2010/0102250 A1 | 4/2010 | Li et al. | |
| 2011/0147450 A1 | 6/2011 | Rapoport et al. | |
| 2012/0145924 A1 | 6/2012 | Tinsley | |
| 2012/0217416 A1* | 8/2012 | Decoux | G07D 7/121 250/459.1 |
| 2013/0234043 A1 | 9/2013 | Hussain et al. | |
| 2013/0277576 A1 | 10/2013 | Tinsley | |
| 2014/0009752 A1 | 1/2014 | Cronin et al. | |

FOREIGN PATENT DOCUMENTS

| | | |
|---|---|---|
| JP | 2012507084 A | 3/2012 |
| WO | 0125821 A2 | 4/2001 |
| WO | 2003009667 A2 | 2/2003 |

OTHER PUBLICATIONS

Vishay Intertechnology, Inc., "IR Receivers," Retreived from Internet Nov. 2, 2015, [http://www.vishay.com/ir-receiver-modules/].

Vishay, "World's Leading Supplier of Infrared (IR) Receivers," OptoElectronics, Oct. 2, 2012.

Extended EP Search Report for Application No. 15856056.5 dated Jun. 19, 2018.

\* cited by examiner

AUTHENTICATION SYSTEMS, AUTHENTICATION DEVICES, AND METHODS FOR AUTHENTICATING A VALUE ARTICLE

PRIORITY CLAIMS

This application claims the benefit of U.S. Provisional Application No. 62/073,354, filed Oct. 31, 2014 and U.S. Provisional Application No. 62/164,131, filed May 20, 2015.

TECHNICAL FIELD

The technical field generally relates to systems, devices, and methods for authenticating a value article. More particularly, the technical field relates to systems, devices, and methods for authenticating value articles using an optical feature of the value article.

BACKGROUND

In many applications, it is necessary to distinguish an original article from a copy or counterfeit to validate the original article. An original article that includes an authenticating feature can be validated in many ways. Some methods involve visible (i.e., overt) authenticating features that are disposed on or incorporated into the article, such as a hologram on a credit card, an embossed image or watermark on a bank note, a security foil, a security ribbon, colored threads or colored fibers within a bank note, or a floating and/or sinking image on a passport. While these features are easy to detect with the eye and may not require equipment for authentication, these overt features are easily identified by a would-be forger and/or counterfeiter. As such, in addition to overt features, hidden (i.e. covert) features may be incorporated in original articles. Examples of covert features include invisible fluorescent fibers, chemically sensitive stains, and taggants such as luminescent pigments or fluorescent dyes that are incorporated into the substrate of the article.

While authentication of covert features that employ taggants is highly reliable through use of authentication equipment, the cost of equipment required for authentication is generally too high for and/or unavailable to the typical consumer or small business owner. Further, most authentication equipment is bulky, rendering use thereof inconvenient for many applications. Production of small, inexpensive authentication devices is challenging because the authentication devices generally include a significant amount of hardware, including an exciting light source, a photodetector, a gain amplifier, and perhaps other components, and it is difficult to include all of those components in a sufficiently small package. To the extent that small authentication devices are available, the small size of the authentication devices makes the authentication devices susceptible to various environmental factors that render accurate authentication difficult. For example, small authentication devices generally include the exciting light source and the photodetector in such close proximity that light produced by the exciting light source enters the photodetector via strong scatter from an article under interrogation. Intensity of the light from the exciting light source is generally many orders of magnitude higher than intensity of emissions from the taggants. While optical filters are generally employed so that the photodetector is not saturated with too much light from the exciting light source, it is difficult to effectively block light produced directly by the exciting light source while still allowing passage of emitted radiation from the taggants. Many excitation sources such as LEDs exhibit emission very far from their primary emission spectral range and that emission can be significant and within the passbands of the optical filters. While it is possible to further block light produced by the exciting light source by employing a thin film dielectric stack filter such as a band pass or a long pass filter, there may still be some undesired level of leakage that remains within the desired pass band of the filter system that is not related to the emitted radiation from the taggants. A number of systems would essentially be fooled by the large amount of signal within the required detection spectral range. Further, many taggants exhibit an overlap in emission wavelength with light produced by the exciting light source such that the overlapping wavelengths cannot be blocked while still enabling detection of the emissions from the taggant.

Accordingly, it is desirable to provide authentication systems, authenticating devices, and methods of authenticating value articles that are capable of effectively interrogating value articles that include a luminescent material for emissions from the luminescent materials while minimizing the impact of light produced by the exciting light source on authentication, even when light from the exciting light source passes into the photodetector. Furthermore, other desirable features and characteristics will become apparent from the subsequent detailed description and the appended claims, taken in conjunction with the accompanying drawings and this background.

BRIEF SUMMARY

Authentication systems, authentication devices, and methods for authenticating value articles are provided herein. In an embodiment, a method for authenticating a value article includes providing the value article including a luminescent material. An exciting light source, an optical filter, a photodetector, a signal manipulation circuit, and an amplifier are provided. The luminescent material of the value article is exposed to light that is produced by the exciting light source. Radiation that includes light from the exciting light source and emitted radiation from the luminescent material is filtered using the optical filter to produce filtered radiation that includes emitted radiation from the luminescent material. The filtered radiation is detected using the photodetector to produce a detected radiation signal. The detected radiation signal is electronically manipulated using the signal manipulation circuit to reduce an effect of light from the exciting light source on an authentication determination based upon the detected radiation signal. The detected radiation signal is amplified with the amplifier after the detected radiation signal is electronically manipulated to produce an amplified electronic signal. The amplified electronic signal or data derived therefrom is converted to an authentication output.

In another embodiment, an authentication device includes an exciting light source that is configured to produce light. An optical filter is configured to filter radiation that includes light from the exciting light source and emitted radiation from a luminescent material and to produce filtered radiation that includes emitted radiation from the luminescent material. A photodetector is configured to detect the filtered radiation. The photodetector produces a detected radiation signal. A signal manipulation circuit is configured to electronically manipulate the detected radiation signal to reduce an effect of light from the exciting light source on an authentication determination based upon the detected radiation signal. An amplifier is provided for amplifying the detected radiation signal after the detected radiation signal is electronically manipulated.

In another embodiment, an authentication system includes an article path that has an inlet. The inlet has the capacity to receive a value article. An authentication device is disposed in the article path. The authentication device includes an exciting light source, an optical filter, a photodetector, a signal manipulation circuit, and an amplifier. The exciting light source is configured to produce light. The optical filter is configured to filter radiation that includes light from the exciting light source and emitted radiation from a luminescent material and to produce filtered radiation that includes emitted radiation from the luminescent material. The photodetector is configured to detect the filtered radiation. The photodetector produces a detected radiation signal. The signal manipulation circuit is configured to electronically manipulate the detected radiation signal to reduce an effect of light from the exciting light source on an authentication determination based on the detected radiation signal. The amplifier is configured to amplify the detected radiation signal after the detected radiation signal is electronically manipulated to produce an amplified electronic signal. Circuitry is provided that has the capacity to convert the amplified electronic signal or data derived therefrom to an authentication output. A user interface is in electronic communication with the authentication device. The user interface has the capacity to communicate an authentication output to a user.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the systems, devices, and methods for authenticating a value article. Furthermore, there is no intention to be bound by any theory presented in the preceding background or the following detailed description.

Systems, devices, and methods for authenticating a value article are provided herein. The systems include an exciting light source, an optical filter, a photodetector, a signal manipulation circuit, and an amplifier. After exposing luminescent material on or in a value article to light produced by the exciting light source, the luminescent material charges/excites as normal since it absorbs the light from the exciting light source, and then discharges/emits with the material time decay characteristic value of "Tau". The optical filter filters radiation that includes light from the exciting light source and emitted radiation from the luminescent material and produces filtered radiation that includes emitted radiation from the luminescent material and also generally includes leaked light from the exciting light source that cannot be completely filtered by the optical filter or that is reflected off of the value article. The combination of the leaked light and the taggant emission signal that remain in the filtered radiation are detected by the photodetector to produce a detected radiation signal. The detected radiation signal is electronically manipulated using the signal manipulation circuit to reduce an effect of light from the exciting light source on an authentication determination based on the detected radiation signal. "Electronic manipulation to reduce an effect of light from the exciting light source on an authentication determination based on the detected radiation signal," as referred to herein, includes blocking of the detected radiation signal or selective attenuation of portions of the detected radiation signal that are attributable to light from the exciting light source. For example, in an embodiment, the signal manipulation circuit may be an electronic frequency filter and the exciting light source may be configured to produce modulated light, i.e., pulsed bursts of light, at a predetermined or preset modulation frequency (as an example, a pulse modulation at 20 pulses per second, for 2 milliseconds at 40 kHz modulation frequency). Portions of the detected radiation signal that are at the predetermined modulation frequency of the exciting light source may then be selectively attenuated with respect to desired portions of the detected radiation signal (i.e., portions of the detected radiation signal produced by emissions from the luminescent material) with the electronic frequency filter to produce a filtered electronic signal. As another example of electronic manipulation, the signal manipulation circuit may be a squelch circuit that effectively blocks the detected radiation signal until production of light from the exciting light source is ceased. The detected radiation signal is amplified with the amplifier after the detected radiation signal is electronically manipulated to produce an amplified electronic signal.

Value articles that include a luminescent material and that may be authenticated using the systems, devices, and methods described herein are not particularly limited and may include an identification card, a driver's license, a passport, identity papers, a banknote, a check, a document, a paper, a stock certificate, a packaging component, a credit card, a bank card, a label, a seal, a coin, a token, a casino chip, a medallion, or a postage stamp. The luminescent material may be disposed within the value article or at the surface of the value article, provided that the luminescent material is positioned to enable absorption of light from the exciting light source and emission of radiation in a manner that enables detection. In embodiments, the value article includes a fibrous web of material that has the luminescent material disposed thereon or therein, e.g., a passport, identity papers, a banknote, a check, a document, a paper, a stock certificate, or a packaging component. In other embodiments, the value article is a metal value article that has the luminescent material disposed on or near a surface thereof, e.g., a coin, a token, a casino chip, or a medallion. The value articles generally include a substrate, and the luminescent material may be included in a surface-applied or embedded authentication feature. Suitable luminescent materials are also not particularly limited provided that the luminescent materials are capable of producing a detectable emission (i.e., output radiation of relatively high spectral energy) in the infrared, visible, and/or ultraviolet portions of the electromagnetic spectrum upon excitation of the materials by appropriate external energy sources. When a luminescent material emits radiation, the emission occurs over a discrete span of time, which may be defined by a measurable decay time constant and signal intensity level. Materials typically described as "fluorophors" (or "fluorescent") exhibit very short emission decay time constants in the micro-, nano- or pico-second range. Conversely, materials typically described as "phosphors" exhibit longer decay time constants ranging from several milliseconds to minutes or more (e.g., up to many hours). Fluorophors and phosphors are both suitable luminescent materials that may be employed in the value articles that are subject to authentication as described herein. In embodiments, the fluorophors and phosphors have decay times of greater than 0.05 milliseconds.

Figure 1:
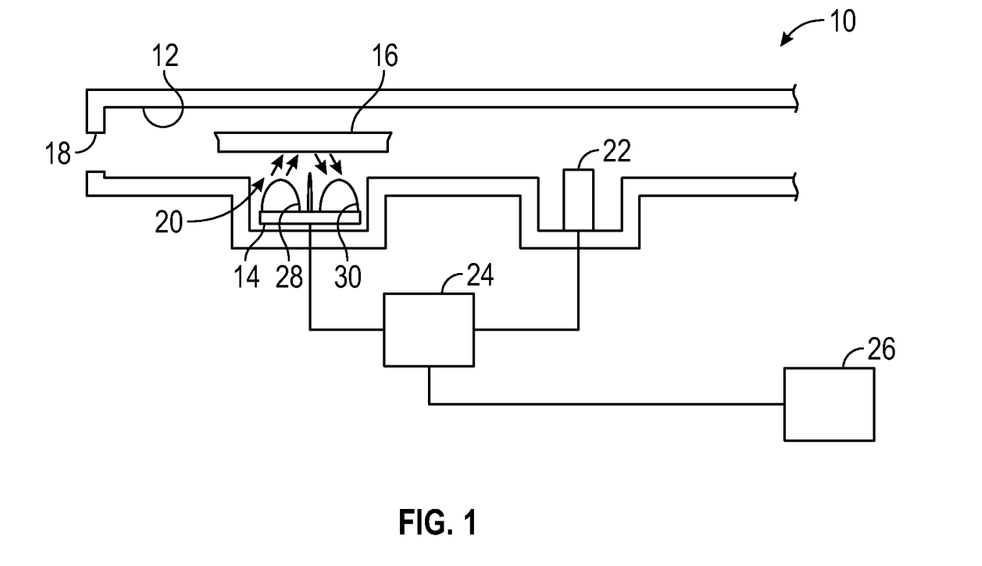
FIG. 1 is a partial schematic view of an authentication system including an authentication device in accordance with an embodiment.

An exemplary embodiment of an authentication system 10 for authenticating a value article 16 that includes a luminescent material will now be described with reference to FIGS. 1-2. Referring to FIG. 1, the authentication system 10 includes an article path 12 and an authentication device 14 disposed in the article path 12. As referred to herein, the "article path" is a channel that is adapted to receive a value article 16 and to guide the value article 16 into an interrogation zone 20 of the authentication device 14. The article path 12 has an inlet 18, and the inlet 18 has the capacity to receive the value article 16. In embodiments, the authentication system 10 is a coin, token, casino chip, or medallion-operated machine, such as a vending machine, that is activated upon insertion of the value article 16 into the article path 12. Thus, in embodiments, the authentication system 10 may further include an electromagnetic detector 22 that has the capacity to detect an electromagnetic signature of the value article 16. In embodiments, a system processor 24 is in electronic communication with the authentication device 14, and may further be in electronic communication with the electromagnetic detector 22 when present, to render an authenticity determination of the value article 16. In other embodiments, the authentication system 10 is a paper-operated machine, such as a currency counter or bill acceptor, and the authenticity determination may be rendered on the basis of information received from the authentication device 14 alone. A user interface 26 may be in electronic communication with the authentication device 14, optionally through the system processor 24, and the user interface 26 has the capacity to communicate an authentication output to a user.

As alluded to above, the authentication device 14 includes the interrogation zone 20, which has the capacity to receive the value article 16 or a portion thereof that includes the luminescent material. In an embodiment and as shown in FIG. 1, the interrogation zone 20 includes a space over the authentication device 14 through which the value article 16 may pass, although it is to be appreciated that in other embodiments the interrogation zone 20 may have the capacity to receive only a portion of the value article 16 that includes the luminescent material. It is to be appreciated that the interrogation zone 20 may be configured in any way that allows interrogation of the luminescent material of the value article 16 by the authentication device 14. For example, in other embodiments and although not shown, the interrogation zone 20 may include a scanning window that receives the portion of the value article 16 by passing the value article 16 past the scanning window.

Figure 2:
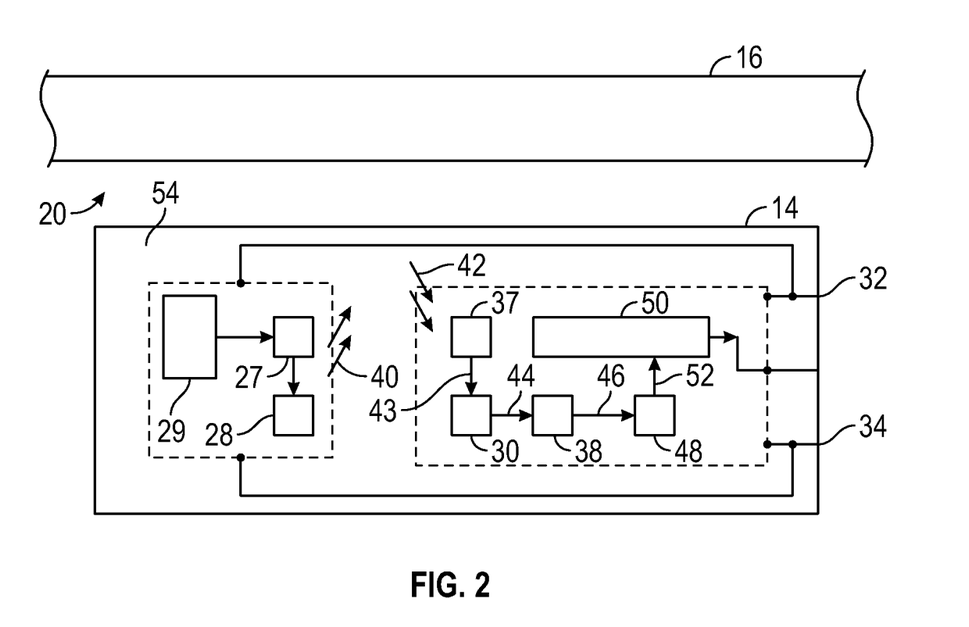
FIG. 2 is a functional block diagram of the authentication device of FIG. 1 in accordance with an embodiment.

Referring to FIG. 2, features of the authentication device 14 will now be described. The authentication device 14 primarily conducts interrogation of the value article 16 and generates data indicative of authenticity of the value article 16. In this regard, the authentication device 14 includes components that enable interrogation of the value article 16 such as, but not limited to, an exciting light source 28 for exciting luminescent material of the value article 16 and a photodetector 30 configured to detect filtered radiation 43 including emitted radiation from the luminescent material after excitation. In embodiments and referring back to FIG. 1, the exciting light source 28 and the photodetector 30 are configured for interrogation of contents of the interrogation zone 20.

It is to be appreciated that the authentication device 14 may include multiple exciting light sources 28 and multiple photodetectors 30, depending upon particular design and functionality considerations desired for the authentication device 14. The exciting light source 28 may include, for example, one or more low power laser diodes, LEDs, or other excitation sources. In embodiments and as described in further detail below, the exciting light source 28 is configured to produce light 40 in a modulated manner at a predetermined modulation frequency, with the modulated nature of the light used for signal filtering as described in further detail below. In this regard and referring to FIG. 2, the authentication device 14 may also include an excitation source driver 27 and a light source trigger receiver 29. The excitation source driver 27 may be an electric power circuit that is used to power (switch on/off) and modulate the exciting light source 28 to produce light 40 in a modulated manner. The light source trigger receiver 29 may be present to communicate the presence of a value article 16 in the interrogation zone 20 and provides the control signal to the excitation source driver 27.

The photodetector 30 is configured to detect filtered radiation 43 including emitted radiation from the luminescent material after excitation using the light 40 to produce a detected radiation signal 44. The photodetector 30 may include one or more electro-optical sensors, photodiodes, or other detection devices. The photodetector 30 has sensitivity within a spectral band of interest, and accordingly may detect emissions that are within that spectral band. For example, the photodetector 30 may include a silicon detector, an indium-gallium-arsenide (InGaAs) detector (e.g., a telecom type or extended InGaAs), a lead-sulfide detector, a lead-selenide detector, a germanium detector, an indium-antimonide detector, an indium-arsenide detector, a platinum-silicide detector, an indium-antimonide detector, or another type of detector. In specific embodiments, the silicon detector is used. In embodiments, multiple photodetectors 30 may be used and configured to detect emissions within a channel corresponding to different bands of interest, and such photodetectors may be of the same or different type or class.

As shown in FIG. 2, the authentication device 14 may further include a power supply 32 that is in electrical communication with the exciting light source 28 and the photodetector 30, with a ground 34 provided to complete the circuit. In embodiments, an optical filter 37 is positioned to filter radiation 42 that includes light 40 from the exciting light source 28 and emitted radiation from the luminescent material before it is provided to the photodetector 30, given that there is generally an excessive amount of reflected excitation light 40 as compared to emissions from the luminescent material and attenuation of incoming light from sources other than the luminescent material enables saturation of a detected radiation signal 44 to be avoided. Filtering of the radiation 42 produces filtered radiation 43 that includes emitted radiation from the luminescent material, with the filtered radiation 43 then being provided to the photodetector 30.

The optical filter 37 may be an absorptive filter, or alternatively may be a band pass or a long pass filter that includes a combination of an absorptive filter with a dielectric thin film filter, with the dielectric thin film filter provided to further reduce the reflected excitation light 40. It is to be appreciated that multiple optical filters 37 may be employed. The optical filter 37 may include, for example, dye impregnated plastic that has the capacity to pass light only within a spectral band of interest. The optical filter 37 allows passage of filtered radiation 43 only within an emission band (i.e., a subset of the entire spectrum), although it is to be appreciated that significant portions of filtered radiation 43 passing through the optical filter 37 may be from sources other than the luminescent material and that are within band of interest. However, the optical filter 37 is generally angle-sensitive and the unwanted light that is blocked at normal incidence may actually pass through the optical filter 37 at higher or lower angles of incidence. The emissions that are not passed are actually reflected back, where the emissions can be re-scattered and can possibly pass through the optical filter 37 on another reflection. Thus, a signal manipulation circuit 38 is further provided as described in further detail below for electronically manipulating the detected radiation signal 44 to alleviate the impact of light 40 from the exciting light source 28 on an authentication determination based on the detected radiation signal 44.

As alluded to above, the exciting light source 28 and the photodetector 30 are configured for interrogation of contents of the interrogation zone 20 of FIG. 1. In this regard, when the value article 16 includes a reflective surface (e.g., the surface of a coin, metal token, banknote, or any other surface of the value article 16 that exhibits light reflection) and due to close proximity between the exciting light source 28 and the photodetector 30, light 40 from the exciting light source 28 may be reflected off of the value article 16 and passed into the photodetector 30 as part of the filtered radiation 43, with a portion of the resulting detected radiation signal 44 generated by the light 40 from the exciting light source 28. Additionally, sunlight may pass into the photodetector 30 as part of the filtered radiation 43 and result in a direct current portion (having no frequency) of the detected radiation signal 44. Additionally, ambient artificial light from incandescent or fluorescent light bulbs may pass into the photodetector 30 as part of the filtered radiation 43 and result in a portion of the detected radiation signal 44 having a very low frequency. The light 40 from the exciting light source 28 can significantly impact an authentication determination based on the detected radiation signal 44.

There are several approaches that are possible for electronically manipulating the detected radiation signal 44 using the signal manipulation circuit 38 and a first embodiment of electronically manipulating the detected radiation signal 44 using the signal manipulation circuit 38 will now be described with reference to FIG. 2. In this embodiment, the luminescent material is exposed to modulated light 40 produced by the exciting light source 28 at a predetermined modulation frequency, the signal manipulation circuit 38 is an electronic frequency filter, and the detected radiation signal 44 is electronically manipulated by selectively attenuating portions of the detected radiation signal 44 that are at the predetermined modulation frequency of the exciting light source 28 with respect to desired portions of the detected radiation signal 44 using the electronic frequency filter 38 to produce a filtered electronic signal 46. The aforementioned portions of the detected radiation signal 44 can be separated from each other due to their wide difference in frequency characteristics. In particular, the modulation frequency of the modulated light 40 produced by the exciting light source 28 can be selectively attenuated, or reduced in amplitude, by placing attenuation filters at that frequency while amplifying the desired portions of the signal. The charge/discharge characteristic waveforms of the luminescent material can be converted into frequency space using a Fourier Transform. As long as the desired frequency components can be amplified to a much greater extent than the undesired frequency content, it should be possible to create a high enough signal to noise ratio for authentication. By selectively attenuating portions of the detected radiation signal 44 at the predetermined modulation frequency, the desired portion of the detected radiation signal 44 from the luminescent material can be effectively isolated, even under circumstances where the emitted radiation 42 has the same wavelength band as a portion of the modulated light 40 and even under circumstances where the exciting light source 28 and the photodetector 30 are in extremely close proximity.

In embodiments, all high frequency above the predetermined frequency (far away from the desired emission frequency content) can be attenuated. In other embodiments, a band pass filter can be formed to block all frequencies outside a range (with presetting of the width and center frequency). In this case, all high frequencies are attenuated along with frequencies associated with sunlight and fluorescent lighting fixtures. Simple filters such as low pass can be prepared with operational amplifier circuitry that is available for I/O devices. In embodiments, multi-stage filtering may be conducted, using one stage to attenuate high frequencies and another to attenuate low frequencies, leaving the desired portion of the detected radiation signal 44 in the filtered electronic signal 46 after the detected radiation signal is electronically manipulated largely unattenuated.

Presetting or predetermining the modulation frequency for the modulated light 40 from the exciting light source 28 and selectively attenuating portions of the detected radiation signal 44 at the predetermined modulation frequency enables effective filtering even when the emitted radiation 42 from the luminescent material has the same or an overlapping wavelength band as the modulated light 40. Same or overlapping wavelength bands are common when conventional exciting light sources 28 are employed, because filtering is conducted independent of wavelength. Conversely, optical filtering of all light from the exciting light source 28 is generally not possible without also removing emitted radiation due to the overlapping wavelength band. In embodiments, the luminescent material exhibits a frequency response during emission of radiation therefrom. Frequency response of the luminescent material may be determined by applying a Fourier Transform to a time domain waveform that represents signal intensity over time. Sine curves, for example, produce a constant frequency response as derived using the Fourier Transform. Direct current, for example, produces a frequency response of 0. However, the frequency response during emission from many luminescent materials decays at a variable rate, and the frequency response is generally dependent upon the decay time. Shorter decay times generally exhibit higher frequency responses, e.g., in the kHz range, and may have a significant portion of emissions at 5 kHz or greater. Longer decay times generally exhibit lower frequency responses and may have a significant portion of emissions under 500 Hz. Frequency responses for conventional luminescent materials are generally known or can be readily ascertained. In embodiments, the frequency response of the luminescent material includes the predetermined modulation frequency of the modulated light 40. In this embodiment, portions of the detected radiation signal 44 that are produced by the luminescent material are also attenuated at the predetermined modulation frequency. However, the predetermined modulation frequency is chosen to avoid frequency response of the luminescent material at peak or near-peak emission intensities that are useful for detection. In embodiments, the predetermined modulation frequency is greater than about 10 kHz, such as from about 20 to about 50 kHz, or such as from about 35 to about 40 kHz. However, it is to be appreciated that the predetermined modulation frequency is not particularly limited so long as emitted radiation 42 from the luminescent material can still be detected in the filtered electronic signal 46.

Additionally, the electronic frequency filter 38 may be fabricated to attenuate direct current and/or portions of the detected radiation signal 44 that are below a threshold frequency, with the predetermined modulation frequency being greater than the threshold frequency. For example, the portions of the detected radiation signal 44 that are below a threshold frequency may be those portions of the detected radiation signal 44 that are produced by ambient artificial light from incandescent or fluorescent light bulbs, which generally have frequencies below 200 Hz. The predetermined modulation frequency is generally greater than about 10 kHz, as set forth above, and represents a separate and distinct frequency that is different from those of ambient light sources.

In embodiments, the filtered electronic signal 46 is amplified with the amplifier 48 to produce an amplified electronic signal 52. In embodiments and as shown in FIG. 2, the electronic frequency filter 38 attenuates the portions of the detected radiation signal 44 due to the exciting light source 28 at the predetermined modulation frequency prior to amplification, with the filtered electronic signal 46 containing the desired portion of the detected radiation signal 44 and with the filtered electronic signal 46 then amplified by a separate amplifier 48. Although only a single amplifier 48 is shown in FIG. 2, it is to be appreciated that multiple stages of amplifiers 48 may be in electronic communication with the electronic frequency filter 38 for amplifying the filtered electronic signal 46. In other embodiments and although not shown, the electronic frequency filter 38 is coupled with the amplifier 48, i.e., the electronic frequency filter 38 and the amplifier 48 are included in the same hardware, with attenuation of the portion of the detected radiation signal 44 at the predetermined modulation frequency due to the exciting light source 28 conducted while the desired portion of the signal is passed and amplified to produce the amplified electronic signal 52.

Referring again to FIG. 2, the authentication device 14 may include a circuitry 50 having the capacity to convert the amplified electronic signal 52 or data derived therefrom to an authentication output. In particular, the circuitry 50 may include an analog to digital converter, and the amplified electronic signal 52 may be passed directly to the circuitry 50 for further conversion to a digital signal that is indicative of authenticity of the value article 16. In other embodiments, the circuitry 50 includes a comparator that is set at a threshold level for the amplified electronic signal 52, with the comparator producing output that goes to a logical value of "1" as long as the amplified electronic signal 52 value remains above a predetermined intensity. Alternatively, in other embodiments, it is possible to pass a "presence only" signal or to turn off the comparator and present the entire amplified electronic signal 52 for analysis. This is generally done by sampling the analog amplified electronic signal 52 using an A-D converter with enough samples to have a representative waveform adequate of further analysis.

In embodiments and as shown in FIG. 2, the exciting light source 28, the photodetector 30, and the electronic frequency filter 38 are disposed on a single substrate 54 thereby minimizing space requirements for the individual elements of the authentication device 14. To further minimize space requirements and to render reverse engineering and identification of operating parameters difficult to identify, the authentication device 14 is an integrated circuit. The authentication device 14 fabricated as an integrated circuit enables device dimensions on the millimeter scale, such as less than 10 mm×10 mm, to be achieved.

A method for authenticating a value article will now be described in accordance with an embodiment in which the electronic frequency filter 38 is employed and selectively attenuates the detected radiation signal 44. In accordance with the exemplary method, the value article 16 is provided that includes the luminescent material, and the value article 16 is introduced into the interrogation zone 20. In embodiments, the presence of the value article 16 is detected and emission of modulated light 40 by the exciting light source 28 is initiated upon detection of the presence of the value article 16. For example, a light source trigger receiver 29 may be present to communicate the presence of the value article 16 and to provide the control signal to the excitation source driver 27, with emission of the modulated light 40 initiated upon sensing the presence of the value article 16 in the interrogation zone 20 or upon sensing of the value article 16 passing into the inlet of the article path. The luminescent material of the value article 16 is exposed to the modulated light 40 that is produced by the exciting light source 28 at the predetermined modulation frequency. After passing through the optional optical filter 37, filtered radiation 43 is detected that includes emitted radiation from the luminescent material. The filtered radiation 43 is detected using the photodetector 30 to produce the detected radiation signal 44, and the detected radiation includes all radiation that is passed through the optional optical filter 37 including radiation from sources other than the luminescent material (e.g., sunlight, artificial light, or other ambient light sources). Additionally, the photodetector 30 is positioned to receive modulated light 40 from the exciting light source 28 that is reflected from the value article 16, and the radiation that is detected by the photodetector 30 further includes the modulated light 40 from the exciting light source 28 that is reflected from the value article 16. Portions of the detected radiation signal 44 that are at the predetermined modulation frequency are selectively attenuated with the electronic frequency filter 38 to produce the filtered electronic signal 46, and the filtered electronic signal 46 is amplified with the amplifier 48 to produce the amplified electronic signal 52. Optionally, the amplified electronic signal 52 is provided to the circuitry 50 to convert the amplified electronic signal 52 or data derived therefrom to the authentication output. The authentication output is indicative of authenticity of the value article 16. For example, the output of the circuitry 50 may be a logical value of "1" as long as the amplified electronic signal 52 value remains above a predetermined intensity value, and the output value may be employed by the authentication system 10 to conduct further functions based upon authentication of the value article 16.

As alluded to above, there are several approaches that are possible for electronically manipulating the detected radiation signal using the signal manipulation circuit. A second embodiment of electronically manipulating the detected radiation signal 44 using the signal manipulation circuit 238 will now be described with reference to FIG. 3. In this embodiment, the luminescent material is exposed to light 40 produced by the exciting light source 28 and the signal manipulation circuit 238 is a squelch circuit. All other features of the authentication device 114 of this embodiment may be the same as those described above unless indicated otherwise. In this embodiment, the detected radiation signal 44 is electronically manipulated by electronically blocking the detected radiation signal 44 with the squelch circuit 238 until production of light 40 from the exciting light source 28 is ceased. In particular, the squelch circuit 238 effectively shorts out the detected radiation signal 44 prior to amplification in amplifier 48. For example, the squelch circuit 238 may electrically short the detected radiation signal 44 when the squelch circuit 238 is closed, although it is to be appreciated that embodiments are possible where the squelch circuit 238 shorts the detected radiation signal 44 when open. By electronically blocking the detected radiation signal 44 until production of light 40 from the exciting light source 28 is ceased, saturation of the detected radiation signal 44 by light 40 from the exciting light source 28 does not impact the authentication determination because the detected radiation signal 44 is effectively ignored when the light 40 influences the detected radiation signal 44. Once production of light 40 from the exciting light source 28 is ceased, electronic blocking of the detected radiation signal 44 by the squelch circuit 238 also ceases, thereby allowing the detected radiation signal 44 to be amplified to produce an amplified electronic signal 52 in the same manner as described above.

Figure 3:
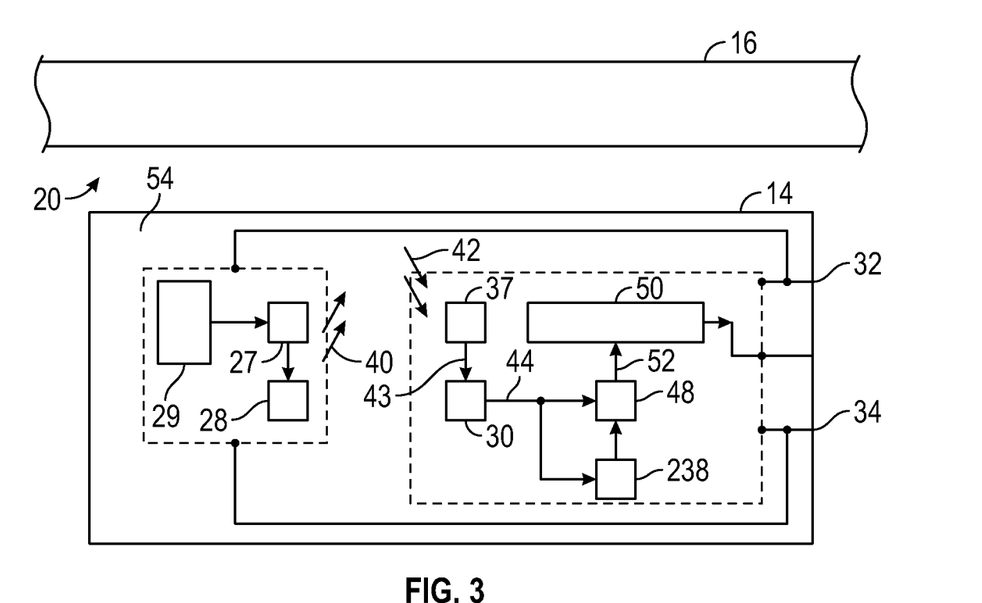
FIG. 3 is a functional block diagram of another embodiment of the authentication device of FIG. 1.

In embodiments, electronic blocking of the detected radiation signal 44 by the squelch circuit 238 also ceases as soon as possible after production of light 40 from the exciting light source 28 is ceased for purposes of detecting intensity of tail emissions from the luminescent material over time. Once electronic blocking of the detected radiation signal 44 ceases, saturation of the detected radiation signal 44 by the light 40 from the exciting light source 28 is no longer a concern during amplification. Voltage of the amplified electronic signal 52 can then be converted to an authentication output in the same manner as described above. It is to be appreciated that, although not shown, amplification of the detected radiation signal 44 may also be conducted prior to electronic blocking by the squelch circuit 238. In this regard, the squelch circuit 238 may be positioned between amplifiers when multiple amplifiers are employed, provided that the squelch circuit 238 is at least positioned prior to a final amplifier 48 that produces the amplified electronic signal 52 that is converted to the authentication output.

Figure 4:
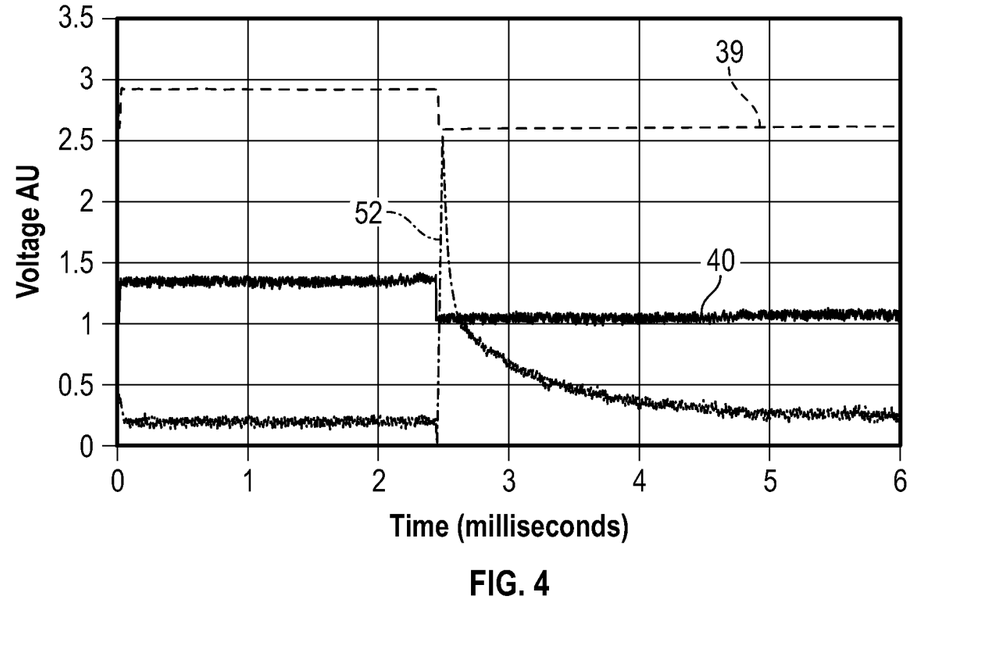
FIG. 4 is a graph illustrating voltage over time for an exciting light source, an amplified radiation signal obtained from emitted radiation from luminescent material, and a squelch circuit during on/off cycling of the exciting light source and the squelch circuit.

Referring to FIG. 4 with continued reference to FIG. 3, a graph illustrating voltage (which correlates to emission intensity) over time for light 40 from the exciting light source 28, amplified radiation signal 52 obtained from emitted radiation 42 from luminescent material, and a squelch circuit voltage 39 during on/off cycling of the exciting light source 28 is shown, with the amplified radiation signal 52 representing tail emissions from the luminescent material for a stationary value article once the squelch circuit 238 and the exciting light source 28 are turned off. Although no lag is illustrated in FIG. 4 between switching off the light 40 from the exciting light source 28 and switching off the squelch circuit 238, it is to be appreciated that a delay generally exists. Voltage over time for the amplified electronic signal 52 can be obtained as described above. While peak emissions from the luminescent material may not be included in the detected radiation signal 44 (or represented in the amplified radiation signal 52 shown in FIG. 4) due to possible electronic lag experienced when switching off the exciting light source 28 and the squelch circuit 238, the amplified radiation signal 52 as illustrated in FIG. 4 enables a determination of decay time constant (Tau). In particular, upon switching off the exciting light source 28 and the squelch circuit 238, the intensity of the detected radiation signal 44 decays over time, and multiple points on the voltage versus time curve for the amplified radiation signal 52 can be measured or curve fit can be employed to determine the rate of decay for the luminescent material. For example, for a simple exponential decay in emission intensity, the decay time constant can be represented by the constant τ (Tau) in the equation:

$$I(t) = I_0 e^{-t/\tau}, \qquad \text{(Equation 1)}$$

where t denotes time, I denotes the emission intensity at time t, and $I_0$ denotes the emission intensity at t=0 (e.g., t=0 may correspond to the instant when the provision of exciting radiation is discontinued).

Figure 5:
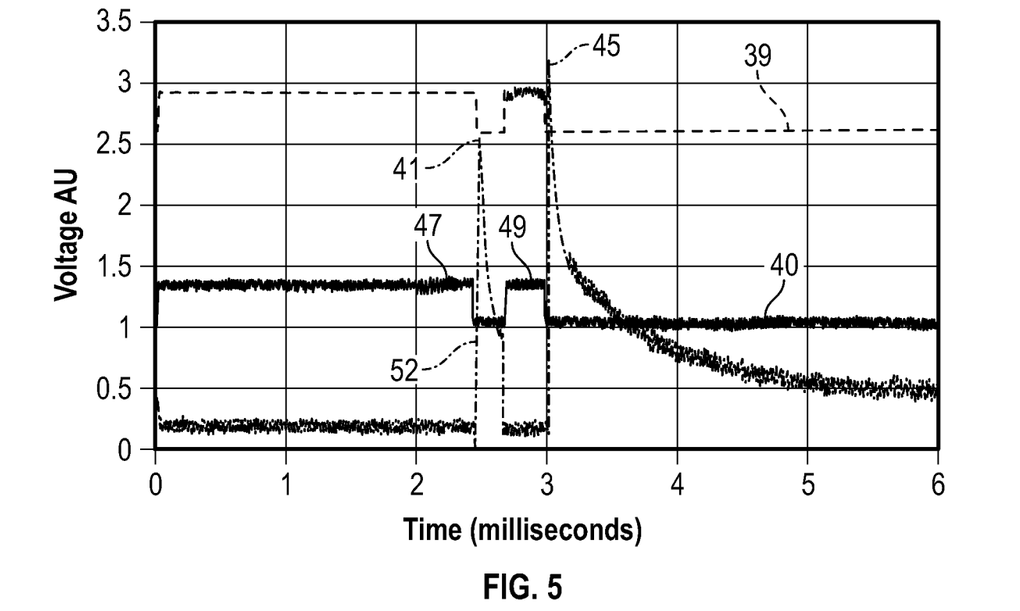
FIG. 5 is a graph illustrating voltage over time for an exciting light source, an amplified radiation signal obtained from emitted radiation from luminescent material, and a squelch circuit during on/off cycling of the exciting light source and the squelch circuit with two pulses of light from the exciting light source and accompanying on/off operation of the squelch circuit.

While FIG. 4 illustrates the tail emission intensity for stationary value articles, many applications involve authentication of moving articles (such as in vending machine applications, currency counting applications, and the like). In applications involving moving articles, emissions from the luminescent material can generally only be detected for very short amounts of time, which does not allow for generation of an intensity versus time curve from which Tau can be determined. However, in embodiments as described herein and referring again to FIG. 3, pulses of light 40 may be employed in conjunction with the squelch circuit 238 to produce short cycles of excitation/emission from the luminescent material from which Tau can be determined. For example, referring to FIGS. 3 and 5, the luminescent material of the value article may be exposed to pulsed light 40 produced by the exciting light source 28 and the detected radiation signal 44 is only electronically blocked using the squelch circuit 238 during production of light 40 from the exciting light source 28. As with FIG. 4, although no lag is illustrated in FIG. 5 between switching off the light 40 from the exciting light source 28 and switching off the squelch circuit 238, it is to be appreciated that a delay generally exists and intervals between pulses of light 40 are generally determined to account for the delay. Referring to FIG. 5 and with continued reference to FIG. 3, the pulses of light 40 can be sufficiently close together such that a second pulse occurs while the luminescent material is still emitting radiation due to a first pulse, with the impact being that excitation of the luminescent material can produce an initial emission intensity 45 after the second pulse is ceased that is greater than an initial emission intensity 41 after the first pulse of light 40.

Tau can be determined by measuring intensity of the emissions from the luminescent material at substantially equal times after the squelch circuit 238 is turned off for both the first pulse and the second pulse of light 40. In this regard, Tau can effectively be determined for moving value articles.

Figure 6A:
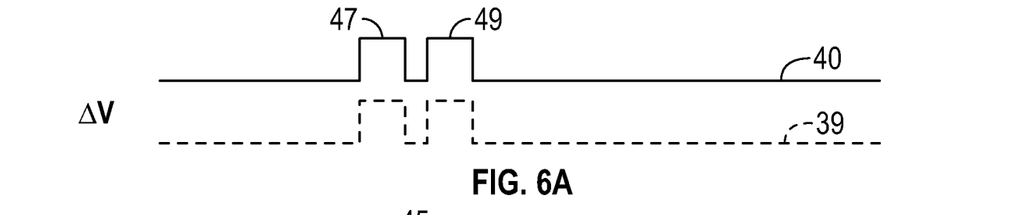
FIGS. 6(a)-6(c) are schematic representations of voltage over time for amplified radiation signals from luminescent material with two pulses of light from the exciting light source and accompanying on/off operation of the squelch circuit for luminescent material having a relatively short decay time (FIG. 6(b)) and for luminescent material having a relatively long decay time (FIG. 6(c)).
Figure 6B:
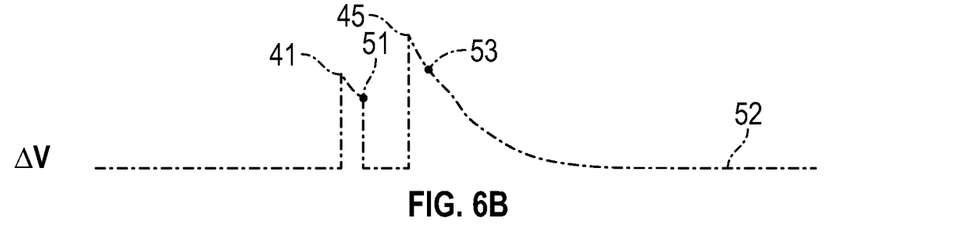
Figure 6C:
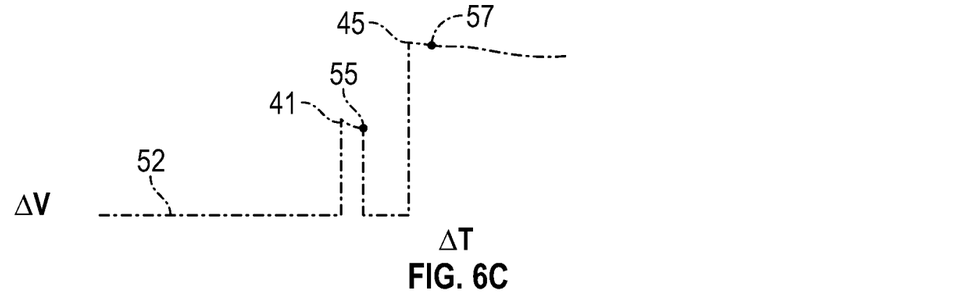

FIGS. 6(a)-6(c) provide schematic representations showing how emission intensities can be measured after the squelch circuit 238 is turned off for both the first pulse and the second pulse of light 40 when luminescent materials having different Tau values are interrogated for purposes of illustrating how the measured emission intensities vary based upon the different Tau values. Again, although no lag is illustrated in FIG. 6(a) between switching off the light 40 and switching off the squelch circuit 238, it is to be appreciated that a delay generally exists. Referring to FIG. 6(a), voltages over time for light 40 including a first light pulse 47 and a second light pulse 49 are illustrated along with corresponding voltages over time for squelch on/off. FIG. 6(b) illustrates emission intensity of luminescent material having a relatively quick decay rate with emission intensity being measured at points 51 and 53, while FIG. 6(c) illustrates emission intensity of luminescent material having a relatively slow decay rate with emission intensity being measured at points 55 and 57. As can be seen from comparison of FIGS. 6(b) and 6(c), a voltage ratio of point 53 to point 51 is significantly less than a voltage ratio of point 57 to point 55. These differences in ratios may be correlated to Tau values.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. A method for authenticating a value article, wherein the method comprises the steps of:
   providing the value article comprising a luminescent material, wherein the luminescent material excites by absorbing light and emits radiation with a decay time of greater than 0.05 milliseconds;
   providing an exciting light source, an optical filter, a photodetector, a signal manipulation circuit, and an amplifier;
   exposing the luminescent material of the value article to light produced by the exciting light source;
   filtering radiation comprising light from the exciting light source and emitted radiation from the luminescent material using the optical filter to produce filtered radiation comprising emitted radiation from the luminescent material;
   detecting the filtered radiation using the photodetector to produce a detected radiation signal;
   electronically manipulating the detected radiation signal using the signal manipulation circuit to reduce an effect of light from the exciting light source on an authentication determination based on the detected radiation signal;
   amplifying the detected radiation signal with the amplifier after the detected radiation signal is electronically manipulated to produce an amplified electronic signal; and
   converting the amplified electronic signal or data derived therefrom to an authentication output.

2. The method of claim 1, wherein the photodetector is positioned to receive light from the exciting light source reflected from the value article, and wherein detecting the filtered radiation further comprises detecting the filtered radiation comprising light from the exciting light source reflected from the value article.

3. The method of claim 1, wherein the signal manipulation circuit is an electronic frequency filter, wherein the luminescent material is exposed to modulated light produced by the exciting light source at a predetermined modulation frequency, and wherein electronically manipulating the detected radiation signal comprises selectively attenuating portions of the detected radiation signal at the predetermined modulation frequency of the exciting light source with respect to desired portions of the detected radiation signal using the electronic frequency filter to produce a filtered electronic signal.

4. The method of claim 3, wherein emitted radiation from the luminescent material has an emission component in the same wavelength band as the modulated light produced by the exciting light source, and wherein selectively attenuating portions of the detected radiation signal comprises selectively attenuating portions of the detected radiation signal produced by the modulated light with the filtered electronic signal including a portion produced by the emitted radiation having the same wavelength band as the modulated light.

5. The method of claim 3, wherein the luminescent material exhibits a frequency response during emission of radiation therefrom, wherein the frequency response of the luminescent material includes the predetermined modulation frequency, and wherein selectively attenuating portions of the detected radiation signal at the predetermined modulation frequency comprises selectively attenuating portions of the detected radiation signal produced by the luminescent material at the predetermined modulation frequency.

6. The method of claim 1, wherein the signal manipulation circuit is a squelch circuit, and wherein electronically manipulating the detected radiation signal comprises electronically blocking the detected radiation signal with the squelch circuit until production of light from the exciting light source is ceased.

7. The method of claim 6, wherein exposing the luminescent material of the value article to light produced by the exciting light source comprises pulsing the light produced by the exciting light source, and wherein electronically manipulating the detected radiation signal comprises electronically blocking the detected radiation signal only during production of light from the exciting light source.

8. The method of claim 7, further comprising measuring voltage of the amplified electronic signal at a substantially equal time interval after each pulse of light is ceased.

9. The method of claim 1, wherein providing the value article comprises providing a value article chosen from an identification card, a driver's license, a passport, identity papers, a banknote, a check, a document, a paper, a stock certificate, a packaging component, a credit card, a bank card, a label, a seal, a coin, a token, a casino chip, a medallion, or a postage stamp.

10. The method of claim 1, further comprising converting the amplified electronic signal to an authentication output using circuitry having the capacity to convert the amplified electronic signal or data derived therefrom to the authentication output.

11. The method of claim 1, further comprising detecting the presence of the value article and initiating emission of light by the exciting light source upon detection of the presence of the value article.

12. The method of claim 1, wherein electronically manipulating the detected radiation signal comprises electronically manipulating the detected radiation signal based upon a modulation frequency or on/off state of the light source.

13. An authentication device comprising:
an exciting light source configured to produce light;
an optical filter configured to filter radiation comprising light from the exciting light source and emitted radiation from a luminescent material and to produce filtered radiation comprising emitted radiation from the luminescent material, wherein the luminescent material excites by absorbing light and emits radiation with a decay time of greater than 0.05 milliseconds;
a photodetector configured to detect the filtered radiation after excitation using the modulated light to produce a detected radiation signal;
a signal manipulation circuit configured to electronically manipulate the detected radiation signal to reduce an effect of light from the exciting light source on an authentication determination based on the detected radiation signal; and
an amplifier configured to amplify the detected radiation signal after the detected radiation signal is electronically manipulated.

14. The authentication device of claim 13, further comprising an interrogation zone having the capacity to receive a portion of a value article that includes luminescent material, wherein the exciting light source and the photodetector are configured for interrogation of contents of the interrogation zone.

15. The authentication device of claim 14, wherein the photodetector is further configured to receive the filtered radiation including light from the exciting light source reflected from the value article in the interrogation zone.

16. The authentication device of claim 13, wherein the exciting light source, the optical filter, the photodetector, and the signal manipulation circuit are disposed on a single substrate.

17. The authentication device of claim 16, wherein the authentication device is an integrated circuit.

18. An authentication system comprising:
an article path having an inlet, wherein the inlet has the capacity to receive a value article;
an authentication device disposed in the article path, wherein the authentication device comprises:
an exciting light source configured to produce light;
an optical filter configured to filter radiation comprising light from the exciting light source and emitted radiation from a luminescent material and to produce filtered radiation comprising emitted radiation from the luminescent material, wherein the luminescent material excites by absorbing light and emits radiation with a decay time of greater than 0.05 milliseconds;
a photodetector configured to detect the filtered radiation to produce a detected radiation signal;
a signal manipulation circuit configured to electronically manipulate the detected radiation signal to reduce an effect of light from the exciting light source on an authentication determination based on the detected radiation signal; and
an amplifier configured to amplify the detected radiation signal after the detected radiation signal is electronically manipulated to produce an amplified electronic signal;
circuitry having the capacity to convert the amplified electronic signal or data derived therefrom to an authentication output; and
a user interface in electronic communication with the authentication device, wherein the user interface has the capacity to communicate an authentication output to a user.

19. The authentication system of claim 18, further comprising an electromagnetic detector having the capacity to detect an electromagnetic signature of the value article.

20. The authentication system of claim 19, further comprising a system processor in electronic communication with the authentication device and the electromagnetic detector to render an authenticity determination of the value article.

* * * * *